(12) United States Patent
Van Ryzin et al.

(10) Patent No.: US 6,353,659 B1
(45) Date of Patent: Mar. 5, 2002

(54) ANSWERING MACHINE APPARATUS ADAPTED FOR USE WITH A TELEPHONE COUPLED TO A TELEPHONE LINE HAVING A TELEPHONE NUMBER ASSOCIATED THEREWITH

(75) Inventors: John M. Van Ryzin, Madison, NJ (US); Adrian Parvulescu, Fish Eddy, NY (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/070,833

(22) Filed: Apr. 30, 1998

(51) Int. Cl.$^7$ .............................. H04M 1/64; H04M 1/00
(52) U.S. Cl. ................. 379/88.12; 379/373; 379/88.22
(58) Field of Search ............................. 379/88.12, 353, 379/373–377, 88.27, 88.26, 88.22

(56) References Cited

U.S. PATENT DOCUMENTS

| | | | | |
|---|---|---|---|---|
| 4,803,717 A | * | 2/1989 | Marui ..................... | 379/88.12 |
| 5,243,642 A | * | 9/1993 | Wise, Jr. et al. .............. | 379/82 |
| 5,313,515 A | * | 5/1994 | Allen et al. ............... | 379/88.12 |
| 5,384,832 A | * | 1/1995 | Zimmerman et al. .... | 379/88.12 |
| 5,661,781 A | * | 8/1997 | DeJager ................... | 379/88.12 |
| 5,754,628 A | * | 5/1998 | Bossi et al. ............... | 379/88.12 |
| 5,794,058 A | * | 8/1998 | Resnick .................... | 379/88.26 |
| 5,802,166 A | * | 9/1998 | Garcia et al. ............. | 379/88.12 |
| 5,825,852 A | * | 10/1998 | DePond et al. ........... | 379/88.12 |
| 5,877,676 A | * | 3/1999 | Shankarappa .......... | 340/309.15 |
| 5,995,594 A | * | 11/1999 | Shaffer et al. ............ | 379/88.12 |
| 6,014,436 A | * | 1/2000 | Florence et al. .......... | 379/88.12 |

\* cited by examiner

*Primary Examiner*—Fan Tsang
*Assistant Examiner*—Ovidio Escalante
(74) *Attorney, Agent, or Firm*—Frommer Lawrence & Haug LLP; William S. Frommer; Dennis M. Smid

(57) ABSTRACT

An answering machine apparatus coupled to a telephone line having a number of telephones coupled thereto for receiving/recording a message or messages which enables a user to determine if a message(s) has been received/recorded by utilizing any of such telephones. That is, if a message or messages have been received/recorded and not reproduced, a signal may be provided to the telephone line when the user places any of the telephones coupled to the telephone line in an off-hook state. Such signal may provide an indication to the user of the respective telephone that a message(s) has been received/recorded. Such indication may continue for a predetermined amount of time, such as 4 seconds, after which a normal dial tone signal may be provided to the respective telephone. Accordingly, the user may determine if a message has been received/recorded by merely placing any of the telephones in an off-hook state.

20 Claims, 1 Drawing Sheet

ANSWERING MACHINE APPARATUS ADAPTED FOR USE WITH A TELEPHONE COUPLED TO A TELEPHONE LINE HAVING A TELEPHONE NUMBER ASSOCIATED THEREWITH

BACKGROUND OF THE INVENTION

The present invention relates to an answering machine apparatus and, more particularly, to such apparatus for use in a system having a number of telephones for providing an indication to a user that a message has been received/recorded when the user places one of the telephones in an off-hook state.

An answering machine may be operative to receive and/or record one or more messages. More specifically, such answering machine may be coupled to a telephone line and utilized in a system (which may be located in a home or office) having a number of telephones each coupled to the same telephone line. With such arrangement, a person may place a telephone call to the telephone number associated with a desired home or office whereupon the telephone or telephones within such home or office may ring so as to indicate an incoming call. If such call is not answered within a predetermined time period, the answering machine (located in such home or office) may be activated so as to enable the person placing the call to record a message thereat. The recorded message may be subsequently reproduced or played back by a user in the respective home or office.

In the above-described arrangement, upon receiving/recording a message, the answering machine may provide an indication to a user that such message has been received/recorded. Such indication may be provided by a light-type device (such as a light emitting diode (LED) or the like) or an audible alarm-type device which may be an integral part of or coupled to the answering machine. However, these two types of devices may be inconvenient to use and/or have disadvantageous features associated therewith as hereinbelow more fully described.

With regard to the light-type device, such device may emit a light of a predetermined color (such as red) or a flashing light of such predetermined color upon receiving/recording a message so as to provide an indication of such received/recorded message. With this device, a user is notified of a received/recorded message by actually viewing the light-type device. As is to be appreciated, in this situation, the user must be in close proximity to the answering machine to view the light-type device. Accordingly, in this situation, if the answering machine is located in one room or portion of the home or office, a user must proceed to such room or portion each time the user wishes to determine if a message has been received/recorded. As a result, it may be inconvenient for a user to determine if a message has been received/recorded by the answering machine.

With regard to the audible alarm-type device, such device may produce an audible sound upon receiving/recording a message so as to provide an indication of such received/recorded message. Such audible sound may continue until disengaged by a user. Although the audible alarm-type device may eliminate the need for a user to have to proceed to the room or portion of a home or office having the answering machine in order to determine if a message has been received/recorded as with the above-described light-type device, there may be several disadvantages with the audible-type device. For example, the audible sound may be annoying and, as a result, the user may be compelled to stop whatever he or she is currently doing just to disengage or terminate the annoying sound. Additionally, if the answering machine is located in a portion of the home or office which is distant from a current location of the user, the user may not be able to hear the audible sound and, as such, may be unaware of the received/recorded message.

Accordingly, it may be desirable to provide an answering machine for receiving and/or recording messages and for providing a user with an indication of a received/recorded message which avoids the above-described disadvantages.

OBJECTS AND SUMMARY OF THE INVENTION

An object of the present invention is to provide an answering machine apparatus adapted to be coupled to a telephone line having a number of telephones coupled thereto for receiving and/or recording messages which enables a user to determine if a message has been received/recorded by utilizing any of such telephones.

More specifically, the present invention provides an answering machine apparatus as aforesaid which provides a signal to the telephone line when the answering machine apparatus receives/records a message and when the user places any of the telephones coupled to the telephone line in an off-hook state so as to provide an indication to the user that the message has been received and/or recorded.

A further object of the present invention is to provide an answering machine apparatus as aforesaid in which the signal indicative of a received/recorded message is terminated (i) within a predetermined time after the user places the respective telephone in an off-hook state or (ii) after the user reproduces or plays back the recorded message or messages.

According to an aspect of the present invention, an answering machine apparatus adapted for use in a system having a telephone for receiving and/or recording messages is provided. The apparatus comprises a circuit for generating a trigger signal when a message has been received and/or recorded; and an audio mixer receiving an alarm signal and a telephone signal for combining the alarm signal with the telephone signal in response to the trigger signal and for supplying the combined signal to a telephone line so as to provide an indication to an operator that the message has been received and/or recorded when the operator activates the telephone.

Other objects, features and advantages according to the present invention will become apparent from the following detailed description of illustrated embodiments when read in connection with the accompanying drawing.

DESCRIPTION OF THE PREFERRED EMBODIMENTS

Figure 1:
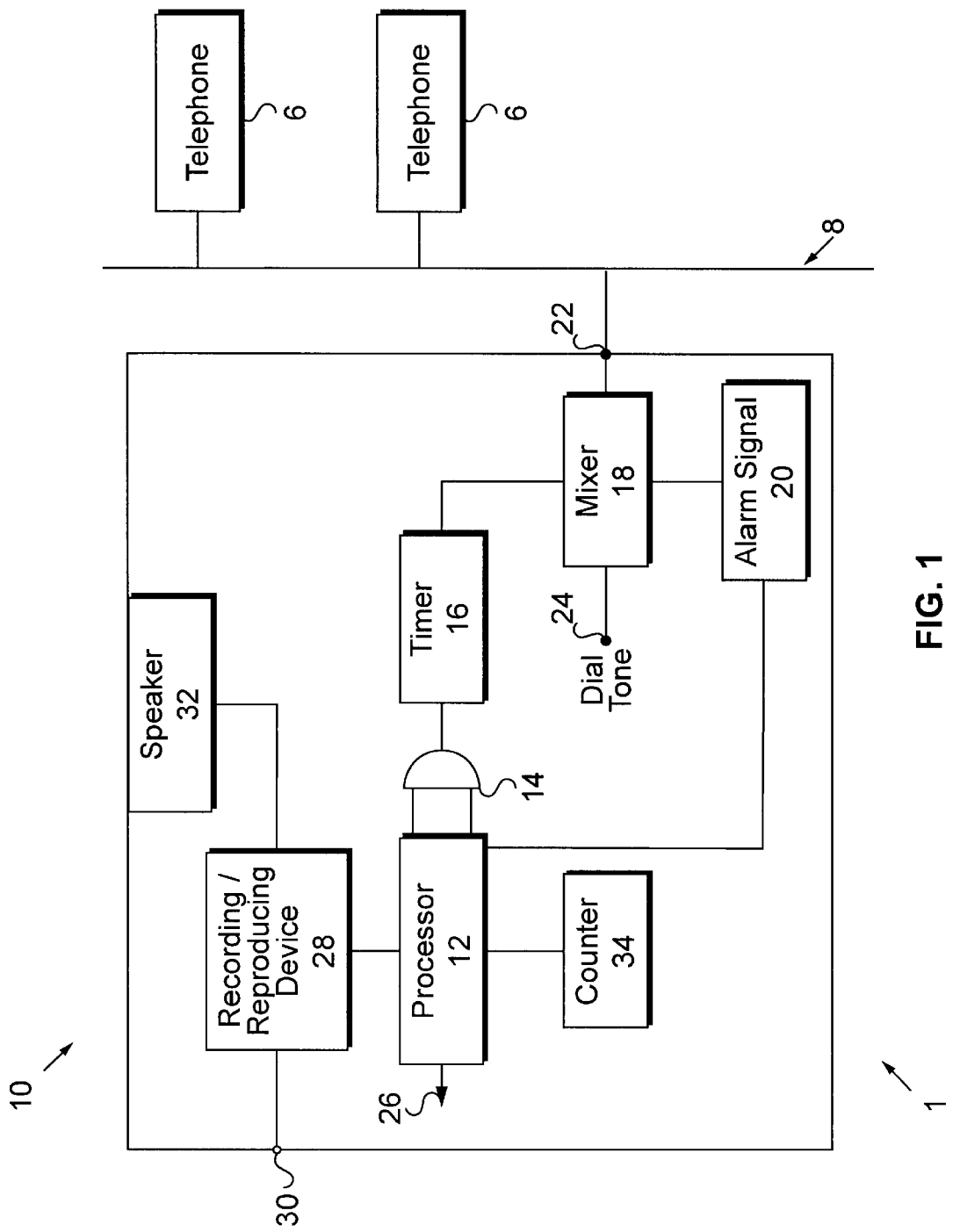
FIG. 1 is a diagram of an answering machine apparatus according to an embodiment of the present invention.

FIG. 1 illustrates a system 1 having an answering machine apparatus 10 and a number of telephones 6, in which the answering machine and the telephones are coupled to a telephone line 8. Such system may be located in a home or office and may have a designated telephone number associated therewith.

The answering machine 10 may include a processor 12, a trigger generating circuit 14, a timer 16, a mixer 18, an alarm signal generator 20, and a recording/reproducing device 28 which may be coupled together as shown in FIG. 1. Such answering machine may be adapted to receive and/or record one or more messages in a manner similar to that of the previously described answering machine. Additionally, the answering machine 10 may be adapted to provide an indication to a user that a message or messages have been received/recorded by utilizing any of the telephones 6.

More specifically, the processor 12 may receive an input signal or signals from an input terminal 26 which may be coupled to the telephone line 8. Such input signal(s) may be a dial tone signal, voice messages, and the like. The processor 12 may process the received voice messages and/or may supply the same to the recording/reproducing device 28 so as to be recorded thereat. A switch 30, coupled to the recording/reproducing device 28, may be operative to activate the recording device 28 so as to enable a recorded message or messages to be reproduced and to supply the reproduced signals to a speaker 32 so as to enable the same to be heard by a user. A play back indication signal which indicates that the message or messages have been reproduced or played back may be supplied to the processor 12.

A display counter 34 may be coupled to the processor 12. Such display counter may be adapted to receive a count signal (which may be a binary-type signal) from the processor 12 indicative of the number of messages which have been received/recorded by the answering machine apparatus 10 and to provide a corresponding display therefrom. As a result, a user may be informed of the number of received/recorded messages from the display counter 34.

The trigger circuit 14 may be coupled to the processor 12. Such trigger circuit may include a number of gate-type devices such as a 2-input AND gate. A first signal indicative that a message has been received/recorded and has not been reproduced or played back may be supplied to a first input of the AND gate 14. This signal may be associated with the display counter 34 such as the count signal which, as previously described, is indicative of the number of messages which have been received/recorded by the answering machine apparatus 10 and, as such, may have a non-zero value. A second signal indicative that one of the telephones 6 has been activated or placed in an off-hook state may be supplied to a second input of the AND gate 14. In response to the receipt of the count signal and the off-hook signal, the AND gate 14 may generate a trigger signal and may supply the same through the timer 16 to an enable input of the mixer 18. The timer 16 may be adapted to allow the trigger signal to be supplied to the mixer 16 for a predetermined amount of time, such as 4 seconds, after which time the timer may inhibit such supply of the trigger signal to the mixer 16. The timer 16 may initiate the start of the predetermined time amount upon receiving a leading edge of the trigger signal.

If, however, the received/recorded message or messages have been reproduced or played back, the play back indication signal may be supplied to the processor 12. As a result, the above-described first signal may not be supplied to the first input of the AND gate 14 and, as such, the trigger signal would not be generated.

In addition to the trigger signal, the mixer 18 may also receive a dial tone signal from a terminal 24 and an alarm signal from the alarm signal generator 20. Such dial tone signal may be supplied directly from the telephone line 8 or by way of the processor 12 or another circuit. The alarm signal, which may be generated by the alarm signal generator 20, may represent a constant or intermittent beep-type signal or the like or, alternately, may represent a particular voice message such as "A MESSAGE HAS BEEN RECEIVED". The alarm signal generator 20 may be activated in response to an activation signal supplied from the processor 12. In response to the enable signal, the mixer 18 may mix or superimpose the alarm signal and the dial tone signal so as to produce a mixed signal which may be provided by way of an output terminal 22 and the telephone line 8 to the respective telephone or telephones which are in the off-hook state.

An operation of the answering machine 10 will now be described.

If an incoming call placed to the telephone number associated with the telephones 6 located within the respective home or office is not answered within a predetermined time period, the answering machine 10 may be activated so as to enable the person placing the call to record a message. In particular, such message(s) may be supplied by way of the input terminal 26 and the processor 12 to the recording/reproducing device 28 so as to be recorded thereat. Further, upon receiving/recording a message, the processor 12 may provide a respective count signal to the display counter 34, whereupon a display may be provided representing the number of received/recorded messages. As a result, by visually observing such display, a user may be informed of the number of received/recorded messages.

Upon determining that a message or messages have been received/recorded by observing the display counter 34, a user, by use of the switch 30, may enable the recorded message or messages to be reproduced or played back and supplied to the speaker 32 so as to enable the user to listen to such message or messages. As a result of such reproduction of the received/recorded message(s), the play back indication signal may be supplied to the processor 12, whereupon the first signal may not be supplied to the AND gate 14 and the trigger signal may not be generated.

On the other hand, if a message or messages have been received/recorded and not reproduced, the count signal (or another signal indicating that at least one message has been received/recorded) may be supplied to the first input of the AND gate 14. When a user places one of the telephones 6 in an off-hook state (or activates one of these telephones), an off-hook signal may be supplied to the second input of the AND gate 14. In response to the two received input signals, the AND gate 14 may generate a trigger signal and may supply the same to the mixer 18 as an enable signal for a predetermined time period, such as 4 seconds. In response to the trigger or enable signal, the mixer 18 mixes the alarm signal received from the alarm signal generating circuit 20 with a dial tone signal and supplies the produced mixed signal to the respective telephone in the off-hook state. As a result, the user of such respective telephone may hear a distinctive sound (for example, a beep-type signal or a message such as "A MESSAGE HAS BEEN RECEIVED") which indicates that a message or messages have been received/recorded. Such distinctive sound (or alarm) may continue for the predetermined time period (which, as previously described, may be 4 seconds). After the predetermined time period or 4 seconds has elapsed, the trigger or enable signal is no longer supplied to the mixer 18 and, as a result, the mixer 18 does not mix the alarm signal with a dial tone signal and does not supply a mixed signal to the respective telephone in the off-hook state. Accordingly, after 4 seconds has elapsed, the user may not hear the alarm sound and, instead, may hear only a dial tone.

Accordingly, with the present answering machine apparatus, if a message or messages have been received/recorded and not reproduced, a signal may be provided to the telephone line when the user places any of the telephones coupled to the telephone line in an off-hook state so as to provide an indication to the user that such message(s) have been received and/or recorded. Such indication may continue for a predetermined amount of time, such as 4 seconds, after which time a normal dial tone signal may be provided to the respective telephone. As a result, the present apparatus enables a user to determine if a message has been received/recorded by merely placing any telephone associated therewith in an off-hook state. As is to be appreciated, unlike the previously described type of answering machines, the present apparatus may not require that a user proceed to the room or portion of the home or office in which the answering machine is located to visually observe an indicator to determine if a message has been received/recorded nor does the present apparatus produce an annoying alarm sound when a message has been received/recorded which may compel a user to stop whatever he or she is currently doing just to disengage or terminate the annoying sound.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. An apparatus adapted to be coupled to a telephone line having a telephone number associated therewith and having a number of telephones coupled thereto each having on and off states and located within a building for receiving and/or recording messages, said apparatus comprising:

a processor coupled to a counter for generating a counter signal indicating that a message has been received and/or recorded;

a circuit for receiving said counter signal and an off-hook signal indicative of an off-hook state of a telephone when the respective telephone has been placed in the off-hook state and for generating a trigger signal therefrom;

an audio mixer receiving a message received signal and a telephone signal for combining said message received signal and said telephone signal in response to said trigger signal and for supplying the combined signal to said telephone line so as to provide an indication to an operator that the message has been received and/or recorded when the operator places the respective telephone in the off-hook state, wherein said apparatus is adapted to be located in the same building as the number of telephones and to be connected with only a single telephone line which is the same as said telephone line coupled to the number of telephones.

2. An apparatus according to claim 1, further comprising a timer for causing the audio mixer to stop combining said message received signal with said telephone signal and supplying the combined signal to the telephone line so that the operator is no longer provided with the indication that the message has been received and/or recorded when a predetermined time has elapsed after the operator has placed the respective telephone in the off-hook state.

3. An apparatus according to claim 1, wherein said telephone signal is a dial tone signal.

4. An apparatus according to claim 1, wherein the receiving and generating circuit includes an AND gate-type device.

5. An apparatus adapted to be coupled to a telephone line having a telephone number associated therewith and having a number of telephones coupled thereto each having on and off hook states and located within a building for receiving and/or recording messages, said apparatus comprising:

means coupled to a counter for generating a counter signal indicating that a message has been received and/or recorded;

means for receiving said counter signal and an off-hook signal indicative of an off-hook state of a telephone when the respective telephone has been placed in the off-hook state and for generating a trigger signal therefrom;

means receiving a message received signal and a telephone signal for combining said message received signal and said telephone signal in response to said trigger signal and for supplying the combined signal to said telephone line so as to provide an indication to an operator that the message has been received and/or recorded when the operator places the respective telephone in the off-hook state, wherein said apparatus is adapted to be located in the same building as the number of telephones and to be connected with only a single telephone line which is the same as said telephone line coupled to said number of telephones.

6. An apparatus according to claim 5, further comprising means for causing the combining and supplying means to stop combining said message received signal with said telephone signal and supplying the combined signal to the telephone line so that the operator is no longer provided with the indication that the message has been received and/or recorded.

7. An apparatus according to claim 6, wherein the causing means includes timer means for causing the combining and supplying means to stop combining said message received signal with said telephone signal and supplying the combined signal to the telephone line when a predetermined time has elapsed after the operator has placed the respective telephone in the off-hook state.

8. An apparatus according to claim 5, wherein said telephone signal is a dial tone signal.

9. An answering machine apparatus adapted for use with a telephone coupled to a telephone line having a telephone number associated therewith and being located in a building for receiving and/or recording messages, said apparatus comprising:

means for generating a trigger signal when a message has been received and/or recorded;

means for receiving an alarm signal and a telephone signal; and means, responsive to said trigger signal, for combining said alarm signal with said telephone signal and for supplying the combined signal to a telephone line so as to provide an indication to an operator that the message has been received and/or recorded when the operator activates the telephone, wherein said answering machine apparatus is adapted to be located in the same building as said telephone and to be connected with only a single telephone line which is the same as said telephone line coupled to said telephone.

10. An apparatus according to claim 1, wherein the generating means includes means for receiving a first signal indicating that the message has been received and/or recorded and a second signal indicating that the telephone has been activated, and wherein the generating means generates said trigger signal in response to said first and second signals.

11. An apparatus according to claim 10, wherein the generating means includes an AND gate-type device for receiving said first and second signals and for generating said trigger signal therefrom.

12. An apparatus according to claim 10, further comprising means for causing the combining and supplying means to stop combining said alarm signal with said telephone signal and supplying the combined signal to the telephone line so that the operator is no longer provided with the indication that the message has been received and/or recorded.

13. An apparatus according to claim 12, wherein the causing means includes timer means for causing the combining and supplying means to stop combining said alarm signal with said telephone signal and supplying the combined signal to the telephone line when a predetermined time has elapsed after the operator has actuated the telephone.

14. An apparatus according to claim 12, further comprising means for reproducing the recorded message and wherein the causing means includes means for preventing the generation of said trigger signal when the operator has reproduced the recorded message.

15. An apparatus according to claim 10, wherein said telephone signal is a dial tone signal.

16. An answering machine apparatus adapted for use with a telephone coupled to a telephone line having a telephone number associated therewith and being located in a building for receiving and/or recording messages, said apparatus comprising:

a circuit for generating a trigger signal when a message has been received and/or recorded; and an audio mixer receiving an alarm signal and a telephone signal for combining said alarm signal with said telephone signal in response to said trigger signal and for supplying the combined signal to a telephone line so as to provide an indication to an operator that the message has been received and/or recorded when the operator activates the telephone, wherein said answering machine apparatus is adapted to be located in the same building as said telephone and to be connected with only a single telephone line which is the same as said telephone line coupled to said telephone.

17. An apparatus according to claim 16, wherein the generating circuit receives a first signal indicating that the message has been received and/or recorded and a second signal indicative that the telephone has been activated, and wherein the generating circuit generates said trigger signal in response to said first and second signals.

18. An apparatus according to claim 17, wherein the generating circuit includes an AND gate-type device.

19. An apparatus according to claim 17, further comprising a timer for causing the audio mixer to stop combining said alarm signal with said telephone signal and supplying the combined signal to the telephone line so that the operator is no longer provided with the indication that the message has been received and/or recorded when a predetermined time has elapsed after the operator has actuated the telephone.

20. An apparatus according to claim 17, wherein said telephone signal is a dial tone signal.

* * * * *